United States Patent
Kaufman et al.

(10) Patent No.: US 11,876,484 B2
(45) Date of Patent: Jan. 16, 2024

(54) PROTECTING SOLAR PANELS FROM DAMAGE DUE TO OVERHEATING

(71) Applicant: Renewable Energy Products Manufacturing Corp., Philadelphia, PA (US)

(72) Inventors: Peter N. Kaufman, Fresh Meadows, NY (US); Nuggehalli M. Ravindra, Summit, NJ (US)

(73) Assignee: Renewable Energy Products Manufacturing Corp., Philadelphia, PA (US)

( * ) Notice: Subject to any disclaimer, the term of this patent is extended or adjusted under 35 U.S.C. 154(b) by 0 days.

(21) Appl. No.: 17/890,202

(22) Filed: Aug. 17, 2022

(65) Prior Publication Data

US 2023/0055374 A1 Feb. 23, 2023

Related U.S. Application Data

(60) Provisional application No. 63/234,334, filed on Aug. 18, 2021.

(51) Int. Cl.
| | |
|---|---|
| *H02S 50/00* | (2014.01) |
| *H02S 40/22* | (2014.01) |
| *G01K 11/12* | (2021.01) |
| *H02S 40/40* | (2014.01) |
| *H02S 40/32* | (2014.01) |

(52) U.S. Cl.
CPC ............. *H02S 50/00* (2013.01); *G01K 11/12* (2013.01); *H02S 40/22* (2014.12); *H02S 40/32* (2014.12); *H02S 40/40* (2014.12)

(58) Field of Classification Search
CPC ......... G01K 11/12; H02S 50/00; H02S 40/22; H02S 40/32; H02S 40/40
See application file for complete search history.

(56) References Cited

U.S. PATENT DOCUMENTS

| | | | | |
|---|---|---|---|---|
| 5,547,283 | A * | 8/1996 | Kronberg | G01K 1/14 374/E11.02 |
| 5,922,996 | A * | 7/1999 | Ryeczek | G01K 11/12 116/207 |
| 2012/0057520 | A1* | 3/2012 | Mumtaz | H02S 50/00 370/315 |
| 2012/0175412 | A1* | 7/2012 | Grabiner | G07G 1/0081 235/375 |
| 2014/0333141 | A1* | 11/2014 | Hu | H02M 7/4807 363/132 |

(Continued)

*Primary Examiner* — Sadie White

(57) ABSTRACT

Systems and methods are provided for protecting solar panels from damage due to overheating. A system comprises a solar panel and a control system. The solar panel comprises a plurality of solar cells, and a plurality of thermochromic temperature sensors thermally coupled to different areas of the solar panel. The thermochromic temperature sensors are configured to change color in response to heat generated by the solar cells in the different areas of the solar panel. The control system is configured to detect colors of the thermochromic temperature sensors, determine a temperature of each area of the solar panel based on the detected colors of the thermochromic temperature sensors, and cause the solar panel to shut down in response to determining that the temperature of at least one area of the solar panel exceeds a predetermined temperature threshold.

17 Claims, 8 Drawing Sheets

(56) References Cited

U.S. PATENT DOCUMENTS

| | | | |
|---|---|---|---|
| 2014/0375343 A1* | 12/2014 | Chen | G08B 21/182 |
| | | | 324/750.02 |
| 2016/0372929 A1* | 12/2016 | Ishikawa | H02J 3/38 |
| 2017/0191107 A1* | 7/2017 | Martini | B01L 3/5085 |
| 2018/0083450 A1* | 3/2018 | Truong | H02J 3/46 |
| 2019/0123683 A1* | 4/2019 | Al Shakarchi | H02S 40/32 |
| 2019/0346602 A1* | 11/2019 | Okumura | G02B 5/28 |
| 2020/0279965 A1* | 9/2020 | Buddgard | H01L 31/044 |

* cited by examiner

300

400

CHANGING COLOR WITH INCREASING TEMPERATURE

PROTECTING SOLAR PANELS FROM DAMAGE DUE TO OVERHEATING

CROSS-REFERENCE TO RELATED APPLICATION

This application claims the benefit of U.S. Provisional Application Ser. No. 63/234,334, filed on Aug. 18, 2021, the disclosure of which is incorporated herein by reference.

TECHNICAL FIELD

This disclosure relates generally to solar power systems and, in particular, techniques for preventing damage to solar panels from overheating.

BACKGROUND

Due to increasing demands for energy placing strain on utility power grids, there is extensive research for alternative ways to provide power, such as solar power, wind power, and other alternative forms of renewable energy. A solar panel (or solar photovoltaic panel or module) comprises an integrated group of photovoltaic cells (or solar cells) that convert light (e.g., sunlight) into electricity, wherein the solar cells are typically formed of crystalline silicon wafers. The solar panel typically comprises a sheet of glass (or other material), which covers and protects the solar cells, while allowing incident light to pass to the solar cells. A given solar panel typically has a number of solar cells ranging from 36 solar cells to 144 solar cells (or as small as 8 and as large as 200). The solar cells are typically connected in series to generate an additive voltage, or strings of series-connected solar cells can be connected in parallel to generate additive current.

In general, solar panels are subject to normal heating due to heat that is generated by the solar cells during normal operation of the solar panel, as well as heating caused by the infrared radiation component of incident sunlight. In addition, solar panels are subject to unwanted heating as a result of shadowing effects caused by, e.g., debris, obstructions, etc., which are present on the surface of the solar panel and which block incident sunlight from reaching one or more solar cells of the solar panel. These shadowing effects result in power loss and possible damage because of the reverse bias applied to the shadowed solar cells (e.g., less-illuminated, or non-illuminated solar cells) by the illuminated solar cells. The solar cells which are reversed-biased as a result of the shadowing effect essentially act as resistive loads, which produce debilitating amounts of heat in those solar cells. In other words, the shadowing effect occurs when a given solar cell (photovoltaic cell) does not receive the same amount of incident irradiation level as the other solar cells in the solar panel, as a result of obstacles. In these conditions, the solar cells receiving a lower level, or no level, of irradiance can actually absorb power instead of producing power. As such, the shadowed solar cells can generate an excessive amount of heat, which can potentially destroy the solar panel (e.g., cause a fire) or otherwise cause permanent degradation of the solar cells.

SUMMARY

Exemplary embodiments of the disclosure include systems and methods for protecting solar panels from damage due to overheating. In an exemplary embodiment, a system comprises a solar panel and a control system. The solar panel comprises a plurality of solar cells, and a plurality of thermochromic temperature sensors thermally coupled to different areas of the solar panel. The thermochromic temperature sensors are configured to change color in response to heat generated by the solar cells in the different areas of the solar panel. The control system is configured to detect colors of the thermochromic temperature sensors, determine a temperature of each area of the solar panel based on the detected colors of the thermochromic temperature sensors, and cause the solar panel to shut down in response to determining that the temperature of at least one area of the solar panel exceeds a predetermined temperature threshold.

Other embodiments will be described in the following detailed description of exemplary embodiments, which is to be read in conjunction with the accompanying figures.

DETAILED DESCRIPTION

Embodiments of the disclosure will now be described in further detail with regard to systems and methods for protecting solar panels from damage due to overheating. It is to be understood that same or similar reference numbers are used throughout the drawings to denote the same or similar features, elements, or structures, and thus, a detailed explanation of the same or similar features, elements, or structures will not be repeated for each of the drawings. The term "exemplary" as used herein means "serving as an example, instance, or illustration". Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., ASICs, FPGAs, etc.), processing devices (e.g., central processing units, microprocessors, microcontrollers, etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
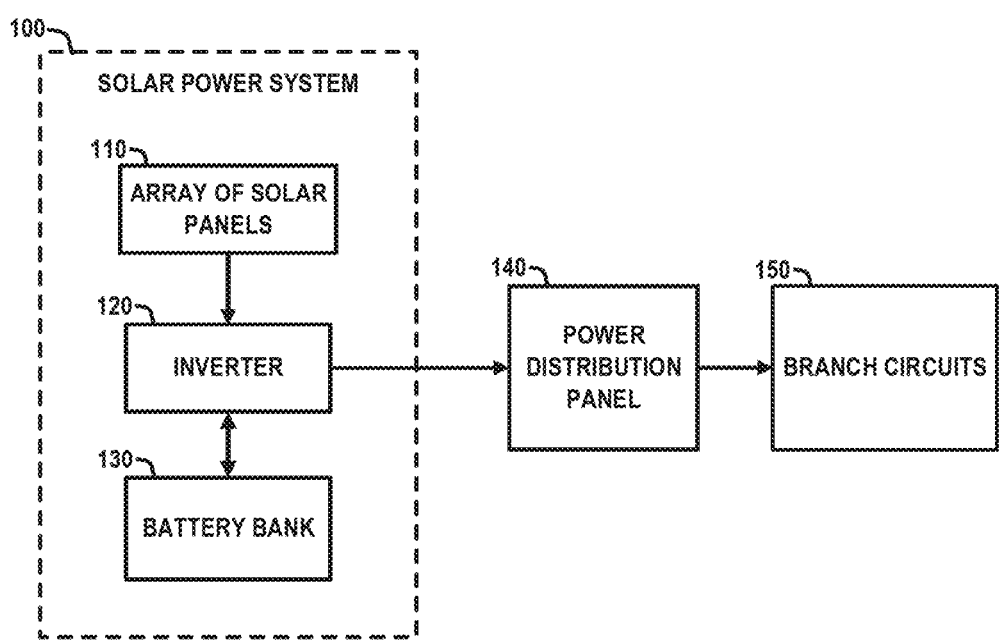
FIG. 1 schematically illustrates a solar power system which can be configured to implement a system for protecting solar panels from damage due to overheating, according to an exemplary embodiment of the disclosure.

FIG. 1 schematically illustrates a solar power system 100 which can be configured to implement a system for protecting solar panels from damage due to overheating, according to an exemplary embodiment of the disclosure. The solar power system 100 comprises an array of solar panels 110, an inverter 120, and a battery bank 130. The solar power system 100 is coupled to a power distribution panel 140 which feeds power to branch circuits 150 of a building. The solar panels 110 convert sunlight into DC power. The DC power is fed to the inverter 120. The inverter 120 converts the DC power into AC power (e.g., 240V AC, 60 Hz).

In some embodiments, the solar power system 100 comprises a hybrid system which combines an "on-grid" connection to a utility grid, and the battery bank 130 which is configured to store excess solar power in DC batteries. More specifically, in a hybrid system, when the solar power system 100 is generating and outputting power to the power distribution panel 130 for consumption by electric devices and loads connected to the branch circuits 150, any excess power generated by the solar power system 100 can be stored in the battery bank 130. Once the battery bank 130 is fully charged, the inverter 120 will stop sending power to the battery bank 130. In a hybrid system, the inverter 120 is configured to perform functions such as, e.g., directing DC power from the array of solar panels 110 to the battery bank 130, converting DC power from the array of solar panels 110 (or other voltage) to AC power that is supplied to the power distribution panel 140, and converting stored DC power in the battery bank 130 into AC power which is supplied to the power distribution panel 140, as desired, to supply power the power distribution panel 140 (e.g., at night time or cloudy days when the solar panels 110 are generating no DC power, or insufficient amount of DC power.

Figure 2:
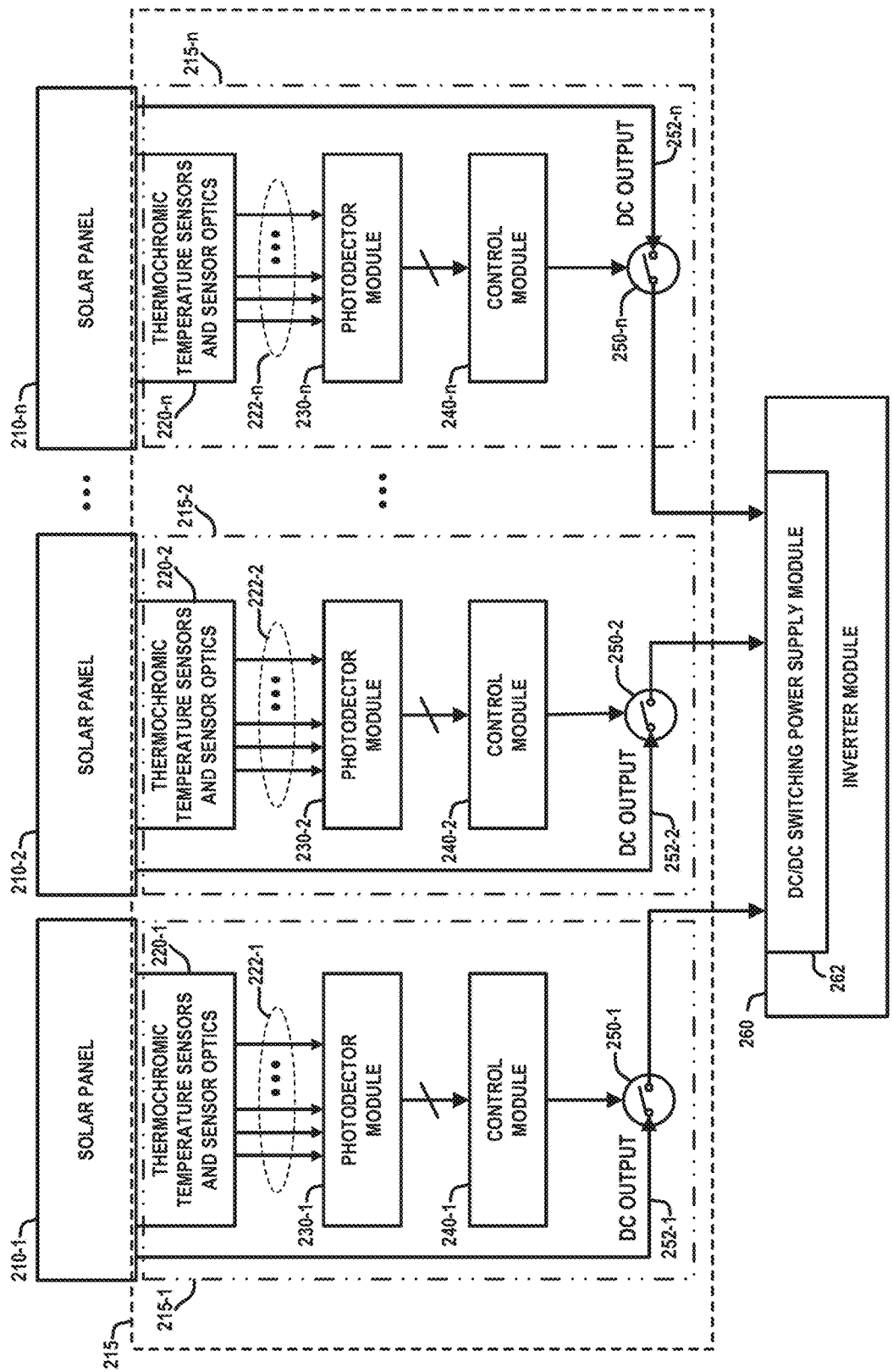
FIG. 2 schematically illustrates a solar power system which comprises a system for protecting solar panels from damage due to overheating, according to an exemplary embodiment of the disclosure.

FIG. 2 schematically illustrates a solar power system 200 which comprises a system for protecting solar panels from damage due to overheating, according to an exemplary embodiment of the disclosure. The solar power system 200 comprises an array of solar panels 210-1, 210-2, . . . , 210-n (alternatively, solar panels 210), a solar panel overheating protection system 215, and an inverter module 260. The solar panel overheating protection system 215 comprises a plurality of temperature sensing and control systems 215-1, 215-2, . . . , 215-n, wherein each temperature sensing and control system 215-1, 215-2, . . . , 215-n is associated with a corresponding one of the solar panels 210-1, 210-2, . . . , 210-n. As shown in FIG. 2, the temperature sensing and control systems 215-1, 215-2, . . . , 215-n 21 comprise respective thermochromic temperature sensors and sensor optics 220-1, 220-2, . . . , 220-n, optical fibers 222-1, 222-2, . . . , 222-n, photodetector modules 230-1, 230-2, . . . , 230-n, control modules 240-1, 240-2, . . . , 240-n, and power switches 250-1, 250-2, . . . , 250-n. Each power switch 250-1, 250-2, . . . , 250-n is coupled to a respective DC power output line 252-1, 252-2, . . . , 252-n of a respective solar panel 210-1, 210-2, . . . , 210-n. In addition, each power switch 250-1, 250-2, . . . , 250-n is coupled to an input of a switching power supply module 262 of the inverter module 260.

In general, the solar panel overheating protection system 215 is configured to monitor and detect the temperature of each solar panel 210-1, 210-2, . . . , 210-n, and shut down a given one of the solar panels solar 210-1, 210-2, . . . , 210-n when the given solar panel is detected to have an abnormally high temperature (out of normal operating range), or when the temperature of the given solar panel is expected to increase to an abnormally high level due to the detected existence of shadows, debris or any obstructions, that are present on the surface solar panel, and covering one or more PV cells. More specifically, in some embodiments, as shown in FIG. 2, the temperature sensing and control systems 215-1, 215-2, . . . , 215-n of the solar panel overheating protection system 215 are configured to independently monitor and detect the temperature of the associated solar panels solar 210-1, 210-2, . . . , 210-n, and independently control operation of the associated solar panels 210-1, 210-2, . . . , 210-n to protect from overheating.

For example, the temperature sensing and control system 215-1 of the solar panel overheating protection system 215 operates as follows. The thermochromic temperature sensors and sensor optics 220-1 comprise a plurality of thermochromic temperature sensors which are disposed across the area of the solar panel 210-1 to detect changes in temperature of different sections (e.g., groups of PV cells) of the solar panel 210-1. The thermochromic temperature sensors are formed of a material (e.g., thermochromic polymer material) which is configured to change color in response to changes in temperature. The temperature sensors and sensor optics 220-1 further comprises a plurality of optical systems, wherein each optical system is associated with a respective one of the thermochromic temperature sensors. Each optical system is configured to capture light that passes through a respective thermochromic temperature sensor, wherein the captured light includes color data which corresponds to a color of the respective thermochromic temperature sensor.

The optical systems transmit the captured light with the color data for each thermochromic temperature sensor through the bundle of optical fibers 222-1 to the photodetector module 230-1. The photodetector module 230-1 is configured to convert the captured light with the color data, which is received from the optical fibers 222-1, into electrical signals which represent the color data each thermochromic temperature sensor, and other relevant information. The control module 240 is configured to process the electrical signals generated by the photodetector module 230-1 to (i) determine colors of the thermochromic temperature sensors, (ii) determine the temperatures of different areas of the solar panel 210-1 based on the determined colors of the thermochromic temperature sensors, and to (iii) generate a control signal to control operation of the power switch 250-1 based on, e.g., the determined temperatures of the different areas of the solar panel 210-1.

The power switch 250-1 is configured to selectively connect the DC output line 252-1 to an input of the inverter module 260 when the power switch 250-1 is activated (or turned ON). When the control module 240-1 determines that one or more areas of the solar panel 210-1 are overheated, or may potentially overheat, the control module 240-1 is configured to generate a control signal to deactivate (or tune OFF) the power switch 250-1 to thereby discounted the DC output line 252-1 from the input of the inverter module 260 and, thus essentially shut down the solar panel 210-1 to protect the solar panel 210-1 from potential damage due to overheating.

It is to be noted that the temperature sensing and control systems 215-2, . . . , 215-n for the respective solar panels 210-2, . . . , 210-n operate in the same or similar manner as the temperature sensing and control systems 215-1 for the solar panel 210-2, the details of which will not be repeated. In some embodiments, the power switches 250-1, 250-2, . . . , 250-n comprise power MOSFET (or similar) devices with respective drain terminals connected to the respective DC output lines 252-1, 252-2, . . . , 252-n, respective source terminals connected to inputs of the switching power supply module 262, and respective gate terminals coupled to the switch control circuitry of the control modules 240-1, 240-2, . . . , 240-n. While FIG. 2 illustrates the power switches 250-1, 250-2, . . . , 250-n as separate elements, in some embodiments, the power switches 250-1, 250-2, . . . , 250-n are incorporated within control circuitry of the respective control modules 240-1, 240-2, . . . , 240-n. In other embodiments, the power switches 250-1, 250-2, . . . , 250-n are incorporated within control circuitry of the inverter module 260 or switching power supply module 262.

Figure 3:
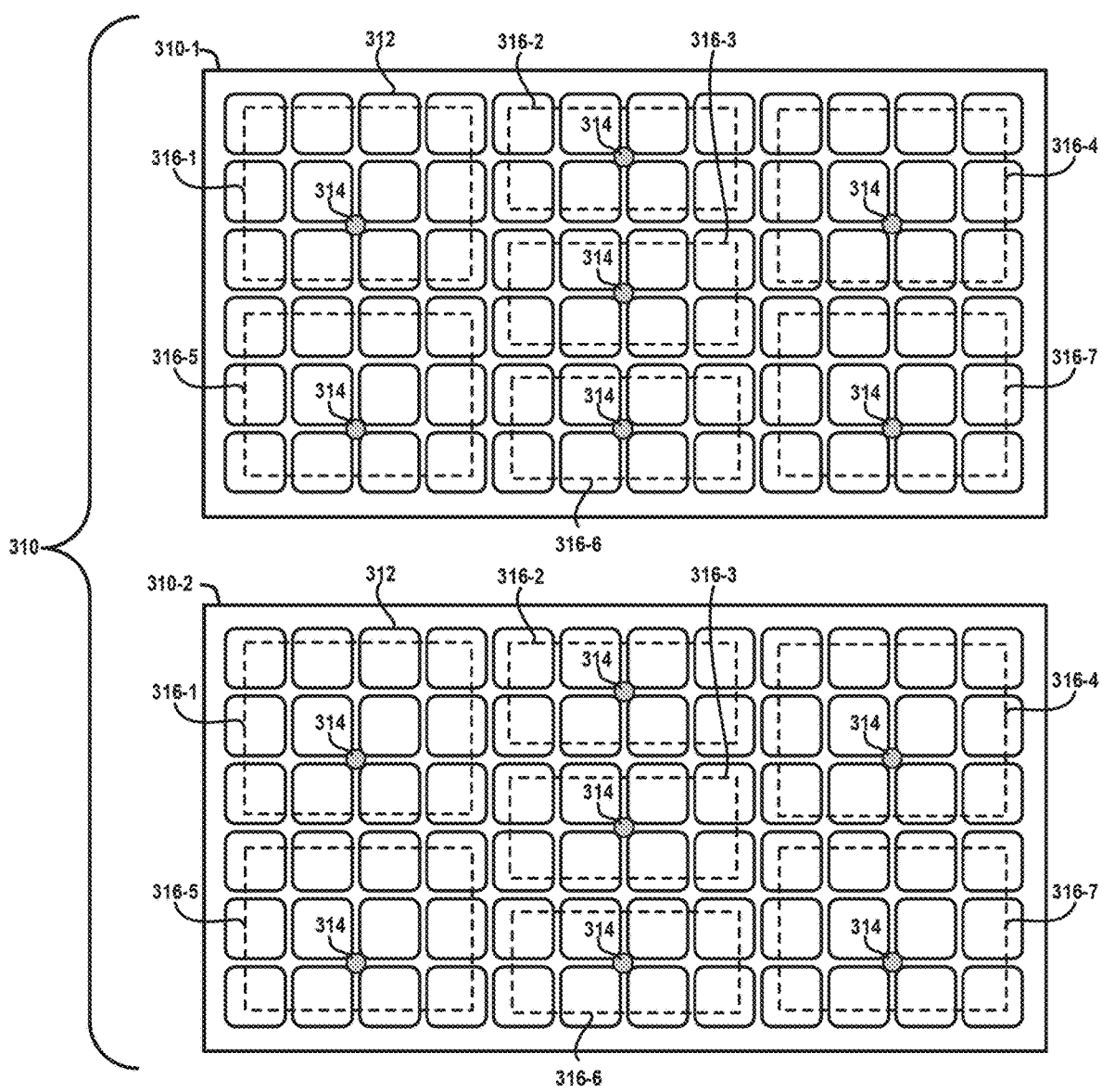
FIG. 3 schematically illustrates an array of solar panels having thermochromic polymer temperature sensors, according to an exemplary embodiment of the disclosure.

Exemplary embodiments of the thermochromic temperature sensors and sensor optics 220-1, 220-2, . . . , 220-n of the solar panel overheating protection system 215 will now be discussed in further detail in conjunction with FIGS. 3, 4, 5A, 5B, and 5C. For example, FIG. 3 schematically illustrates an array of solar panels having thermochromic polymer temperature sensors, according to an exemplary embodiment of the disclosure. In particular, FIG. 3 schematically illustrates a thermochromic polymer temperature sensor system 300 which is implemented for a solar panel array 310 comprising a first solar panel 310-1 and a second solar panel 310-2. The first and second solar panels 310-1 and 310-2 each comprise an array of seventy-two (72) solar cells 312 (or PV cells). In some embodiments, the solar cells 312 in the first solar panel 310-1 are connected in series to generate an additive DC voltage which is output on a DC power output line of the first solar panel 310-1. Similarly, the solar cells 312 of the second solar panel 310-2 are connected in series to generate an additive DC voltage which is output on a DC power output line of the second solar panel 310-2.

As further schematically shown in FIG. 3, the first solar panel 310-1 comprises a plurality of through holes 314, and a plurality of thermochromic temperature sensors 316-1, 316-2, 316-3, 316-4, 316-5, 316-6, and 316-7 which are thermally coupled to a backside of the first solar panel 310-1. The footprints of the thermochromic temperature sensors 316-1, 316-2, 316-3, 316-4, 316-5, 316-6, and 316-7 are shown in FIG. 3 as hidden (dashed) lines. Each thermochromic temperature sensor 316-1, 316-2, 316-3, 316-4, 316-5, 316-6, and 316-7 has a footprint area that is configured to thermally couple to a different group of solar cells 312 (e.g., a group of 4, 6, 8 or more solar cells). For instance, in the exemplary embodiment of FIG. 3, the thermochromic temperature sensors 316-1 316-4, 316-5, and 316-7 each have a footprint area that covers a different group of 12 solar cells, while the thermochromic temperature sensors 316-2, 316-3, and 316-6 each have footprint area that covers a different group of 8 solar cells. Similarly, the second solar panel 310-2 comprises a same number and arrangement of thermochromic temperature sensors 316-1, 316-2, 316-3, 316-4, 316-5, 316-6, and 316-7, and associated through holes 314, as the first solar panel 301-2.

In this configuration, each solar cell 312 of the first solar panel 310-1 is thermally coupled to one of the thermochromic temperature sensors 316-1, . . . , 316-7 on the backside of the first solar panel 310-1, and each solar cell 312 of the second solar panel 310-2 is thermally coupled to one of the thermochromic temperature sensors 316-1, . . . , 316-7 on the backside of the second solar panel 310-2. Furthermore, each through hole 314 is aligned to a central region of one of the thermochromic temperature sensors 316-1, 316-2, 316-3, 316-4, 316-5, 316-6, and 316-7. In some embodiments, each through hole 314 comprises a hole that is formed through a supporting substrate of the solar cells 312 of the first and second solar panels 310-1 and 310-2. The through holes 314 allow incident light, which passes through a front glass surface of the solar panels 310-1 and 310-3 to pass through holes 314 in the supporting substrate of the solar cells, and thereby illuminate portions of the respective thermochromic temperature sensors 316-1, 316-2, 316-3, 316-4, 316-5, 316-6, and 316-7 on the backside of the solar panels. In some embodiments, the through holes 314 are formed in regions of the supporting sub state at the corners of four adjacent solar cells 312. This region for the though holes 314 is preferred since the solar cells 312 have rounded corners, providing sufficient area to form through holes 314 having the largest possible diameter (e.g., as compared to forming through holes in the narrow spaces between two adjacent solar cells 312).

As explained in further detail below in conjunction with FIGS. 5A-5C, each through hole 314 is aligned with a respective one of a plurality of optical system interfaces which are disposed on the backsides of the solar panels. The incident light which passes from the front glass panel through the holes 314 illuminates a portion of the thermochromic temperature sensors 316-1, 316-2, 316-3, 316-4, 316-5, 316-6, and 316-7, which are aligned to the respective through hole 314, on the backside of the solar panels. The colored light which results from the illumination of the thermochromic temperature sensors 316-1, 316-2, 316-3, 316-4, 316-5, 316-6, and 316-7 is captured by the optical system interfaces and transmitted to a photodetector module via optical fibers. In some embodiments, there is one optical system interface for each thermochromic temperature sensor 316-1, 316-2, 316-3, 316-4, 316-5, 316-6, and 316-7, whereby each optical system interface and associated thermochromic temperature sensor is configured to monitor the temperature of corresponding group of solar cells.

FIG. 3 shows an exemplary embodiment in which each solar panel 310-1 and 310-2 comprises an array of solar cells that are divided into seven (7) thermochromic temperature sensing groups, wherein each group of solar cells is individually monitored for overheating due to shadowing of one or more solar cells within the group of solar cells. As noted above, in some embodiments, the solar cells 312 in the first solar panel 310-1 are connected in series to generate an additive DC voltage which is output on a DC power output line of the first solar panel 310-1, and the solar cells 312 of the second solar panel 310-2 are connected in series to generate an additive DC voltage which is output on a DC power output line of the second solar panel 310-2. To protect the solar cells from overheating and mitigate heat-inducted degradation due to shadowing of one or more solar cells in a given one of the solar panels 310-1 and 310-2 of the solar panel array 310, the given solar panel can be shut down and disconnected from providing DC power to the load, leaving the remaining solar panel to produce DC power. The disconnection of the solar panel from the load eliminates the overheating of the shadowed solar cell(s) due to $I^2R$ heating.

Figure 4:
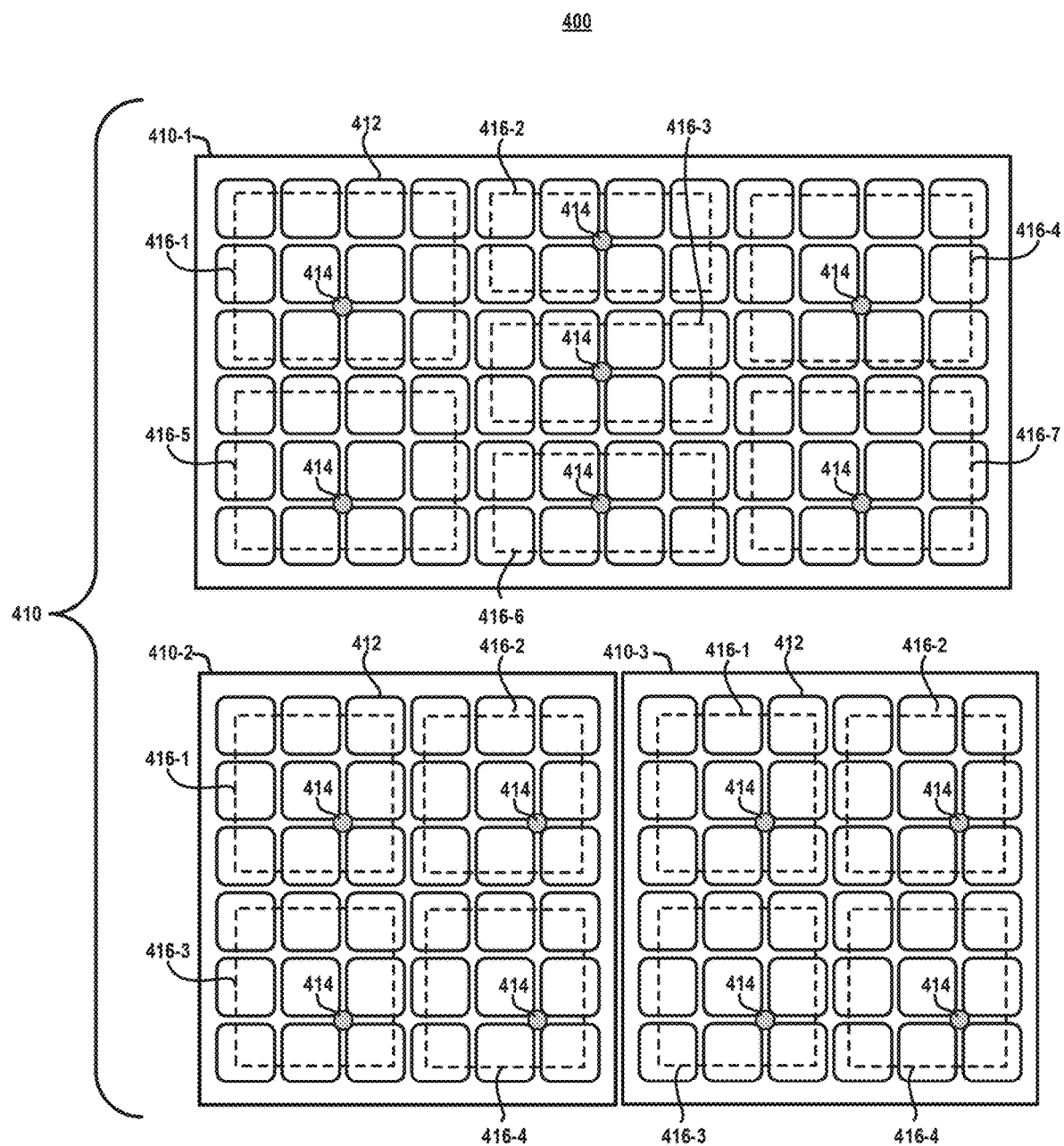
FIG. 4 schematically illustrates an array of solar panels having thermochromic polymer temperature sensors, according to another exemplary embodiment of the disclosure.

While FIG. 3 schematically illustrates an exemplary embodiment of a thermochromic polymer temperature sensor system that is implement for a solar panel array having two solar panels of the same size, it is to be understood that a thermochromic polymer temperature sensor system can be implemented in a solar panel array having any number of solar panels, wherein the solar panels within the array have the same sizes, or different sizes. For example, FIG. 4 schematically illustrates an array of solar panels having thermochromic polymer temperature sensors, according to another exemplary embodiment of the disclosure. In particular, FIG. 4 schematically illustrates a thermochromic polymer temperature sensor system 400 which is implemented for a solar panel array 410 comprising a first solar panel 410-1, a second solar panel 310-2, and a third solar panel 310-2. The first solar panel 410-1 comprises an array of seventy-two (72) solar cells 412, a plurality of through holes 414, and a plurality of thermochromic temperature sensors 416-1, 416-2, 416-3, 416-4, 416-5, 416-6, and 416-7 which are thermally coupled to a backside of the first solar panel 410-1. In this embodiment, the first solar panel 410-1 comprises a similar solar cell grouping and associated thermochromic polymer temperature sensor and through hole configuration as the first and second solar panels 310-1 and 310-2 of FIG. 1, as discussed above.

Further, the second solar panel 410-2 comprises an array of thirty-six (36) solar cells 412, a plurality of through holes 414, and a plurality of thermochromic temperature sensors 416-1, 416-2, 416-3, and 416-4, which are thermally coupled to a backside of the second solar panel 410-2. Each thermochromic temperature sensor 416-1, 416-2, 416-3, and 416-4 (with footprints shown as hidden (dashed) lines) of the second solar panel 410-2 is thermally coupled to a group of nine (9) solar cells, and each through hole 414 is aligned to a corresponding one of the thermochromic temperature sensors 416-1, 416-2, 416-3, and 416-4. Similarly, the third solar panel 410-3 comprises a same number and arrangement of thermochromic temperature sensors 416-1, 416-2, 416-3, and 416-4, and associated through holes 414, as the second solar panel 410-2.

FIG. 4 shows an exemplary embodiment in which the first solar panel 410-1 comprises an array of solar cells that are divided into seven (7) thermochromic temperature sensing groups, wherein each group of solar cells is individually monitored for overheating due to shadowing of one or more solar cells within the group of solar cells. In addition, the second and third solar panels 410-2 and 410-3 each comprise an array of solar cells that are divided into four (4) thermochromic temperature sensing groups, wherein each group of solar cells is individually monitored for overheating due to shadowing of one or more solar cells within the group of solar cells. In some embodiments, the seventy-two (72) solar cells 412 of the first solar panel 410-1 are connected in series to generate an additive DC voltage which is output on a DC power output line of the first solar panel 410-1. In addition, the solar cells 412 of the second solar panel 410-2 are connected in series to generate an additive DC voltage which is output on a DC power output line of the second solar panel 410-2. Similarly, the solar cells 412 of the third solar panel 410-3 are connected in series to generate an additive DC voltage which is output on a DC power output line of the third solar panel 410-3. To protect the solar cells from overheating and mitigate heat-inducted degradation due to shadowing of one or more solar cells in a given one of the solar panels 410-1, 410-2, and 410-3 of the solar panel array 410, the given solar panel can be shut down and disconnected from providing DC power to the load, leaving the remaining solar panels to produce DC power. The disconnection of the solar panel from the load eliminates the overheating of the shadowed solar cell(s) due to $I^2R$ heating.

Figure 5A:
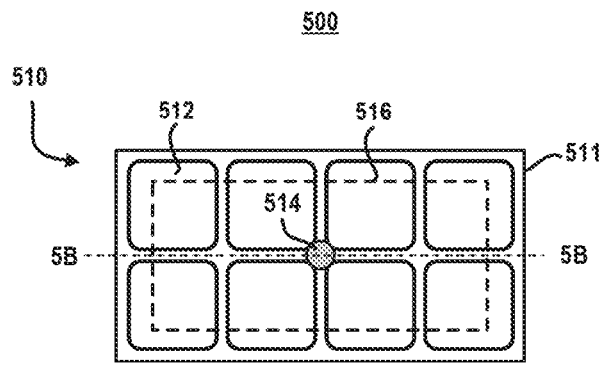
FIGS. 5A, 5B, and 5C schematically illustrate a configuration of thermochromic polymer temperature sensors and sensor optics, according to an exemplary embodiment of the disclosure.
Figure 5B:
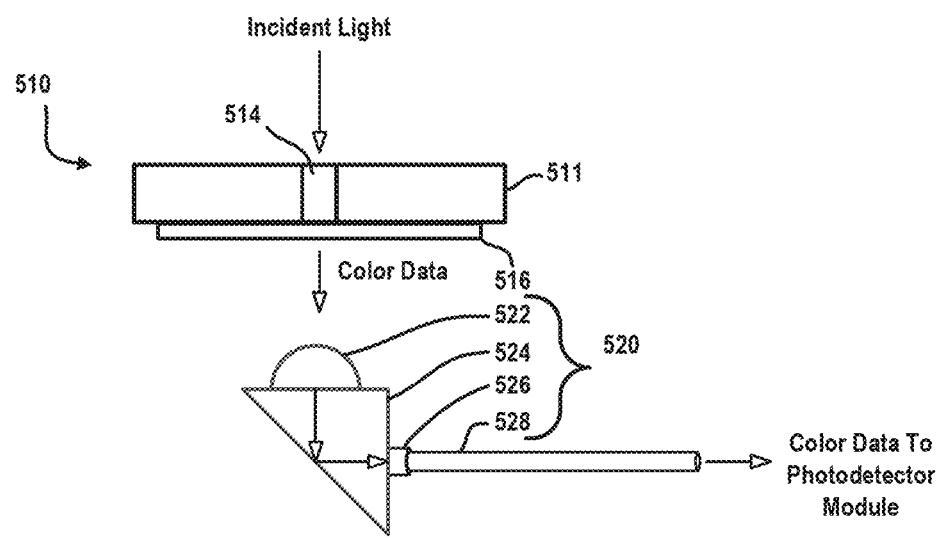
Figure 5C:
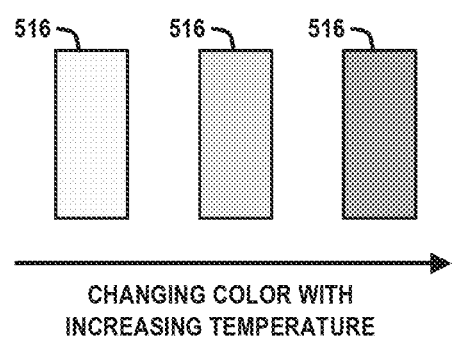

FIGS. 5A, 5B, and 5C schematically illustrate a configuration of thermochromic polymer temperature sensors and sensor optics, according to an exemplary embodiment of the disclosure. In particular, FIG. 5A schematically illustrates a thermochromic polymer temperature sensor system 400 which is implemented for a solar panel 510 comprising a plurality of solar cells 512 embedded in a supporting substrate 511, a through hole 514 formed through the supporting substrate 511, and a thermochromic temperature sensor 516 which is thermally coupled to a backside supporting substrate 511 of the solar panel 510. For ease of illustration and discussion, FIG. 5A illustrates a portion of the solar panel 510 having a thermochromic temperature sensing group of six (6) solar cells, wherein the group of solar cells is individually monitored for overheating due to shadowing of one or more solar cells 512 within the group.

Moreover, FIG. 5B schematically illustrates a cross-sectional side view of the solar panel 510 along line 5B-5B in FIG. 5A, as well as an optical interface 520 associated with the thermochromic temperature sensor 516. As schematically illustrated in FIG. 5B, the thermochromic temperature sensor 516 is disposed on a bottom of the supporting substrate 511 and in thermal communication with each of the six (6) solar cells 512 within the thermochromic temperature sensing group. The optical interface 520 (alternatively referred to herein as optical system 520) comprises a lens 522, a prism 524, a fiber optic ferrule 526, and a fiber optical cable 528, the functions of which will be explained in further detail below.

In some embodiments, the thermochromic temperature sensor 516 comprises a thermochromic polymer film that is coupled to the backside of the solar panel (e.g. to the backside of the solar cell supporting substrate 511) in alignment with the through hole 514. thermochromic temperature sensor 516 comprises a polymer material that is configured to reversibly change color in response to temperature changes. As in known in the art, a thermochromic material is undergoes a structural transformation at a certain threshold temperature which affects the optical properties of the thermochromic material. Upon exposure to a preselected temperature threshold, the structural transformation of thermochroic material results in a visible color change. For example, FIG. 5C schematically illustrates a change in color (e.g., illustrated via grayscale coloring in FIG. 5C from light to darker) of the thermochromic temperature sensor 516 in response to increasing temperature of the thermochromic temperature sensor 516.

In the exemplary embodiments of FIGS. 5A and 5B, when one or more of the solar cells 512 (within the group of solar cells coupled to the thermochromic temperature sensor 516) become overheated as a result of, e.g., the shadowing effect, heat energy from overheated solar cells will be absorbed by the thermochromic temperature sensor 516 causing the thermochromic temperature sensor 516 to change color as the operating temperatures of the solar cells 512 within the group of solar cells change. In some embodiments, the thermochromic temperature sensor 516 is configured to have predetermined temperature threshold which corresponds to temperature level which is deemed excessive and potentially damaging to the solar cells. In some embodiments, depending on the thermal conductivity of the material of the thermochromic temperature sensor 516, a thin thermally conductive layer of material can be disposed between the supporting substrate and the outer perimeter region of the thermochromic temperature sensor 516 to facilitate the transfer of heat from the outer perimeter region of the thermochromic temperature sensor 516 to a central region of the thermochromic temperature sensor 516 which is aligned to the through hole 514. In such embodiments, the thin thermally conductive layer would not be disposed in the central region of the thermochromic temperature sensor 516 aligned to the through hole, to allow the incident light to pass through the thermochromic temperature sensor 516 without blockage or filtering due to the thin thermally conductive layer.

As shown in FIG. 5B, incident light (e.g., sunlight) on the front surface of the solar panel 510 passes through the panel through hole 514 and illuminates a portion of the thermochromic temperature sensor 516. The thermochromic temperature sensor 516 is translucent so that incident light which passes through the panel through hole 514 and thermochromic temperature sensor 516, will emerge from the thermochromic temperature sensor 516 with the color of the thermochromic temperature sensor 516 (e.g., providing color data). The lens 522 and prism 524 serve to capture the colored light and direct the colored light to the fiber optic cable 528, wherein the colored light is sent to an associated photodetector module. In particular, the lens 522 is configured to collect and focus the colored light which emerges from the thermochromic temperature sensor 516, and the prism 524 is configured to reflect the focused colored light into the fiber optic cable 528 for transmission to the photodetector array.

The optical system 520 shown in FIG. 5B comprise an optical interface that is configured capture optical information, during real-time operation of the solar panel, which is indicative of the operating temperature of a particular group of solar cells of the solar panel. It is to be understood that while FIGS. 5A and 5B illustrate the temperature sensor and optics for a single group of solar cells, each group of solar cells of the solar panel would have a dedicated thermochromic temperature sensor and optical system having the same or similar configuration as the elements 516 and 220 shown in FIG. 5B. In some embodiments, FIGS. 5A, 5B, and 5C schematically illustrate an exemplary embodiment of the thermochromic temperature sensors and sensor optics 220-1, 220-2, ..., 220-n, and associate fiber optic cables 222-1, 222-2, ..., 222-n, shown in the exemplary embodiment of FIG. 2.

Figure 6A:
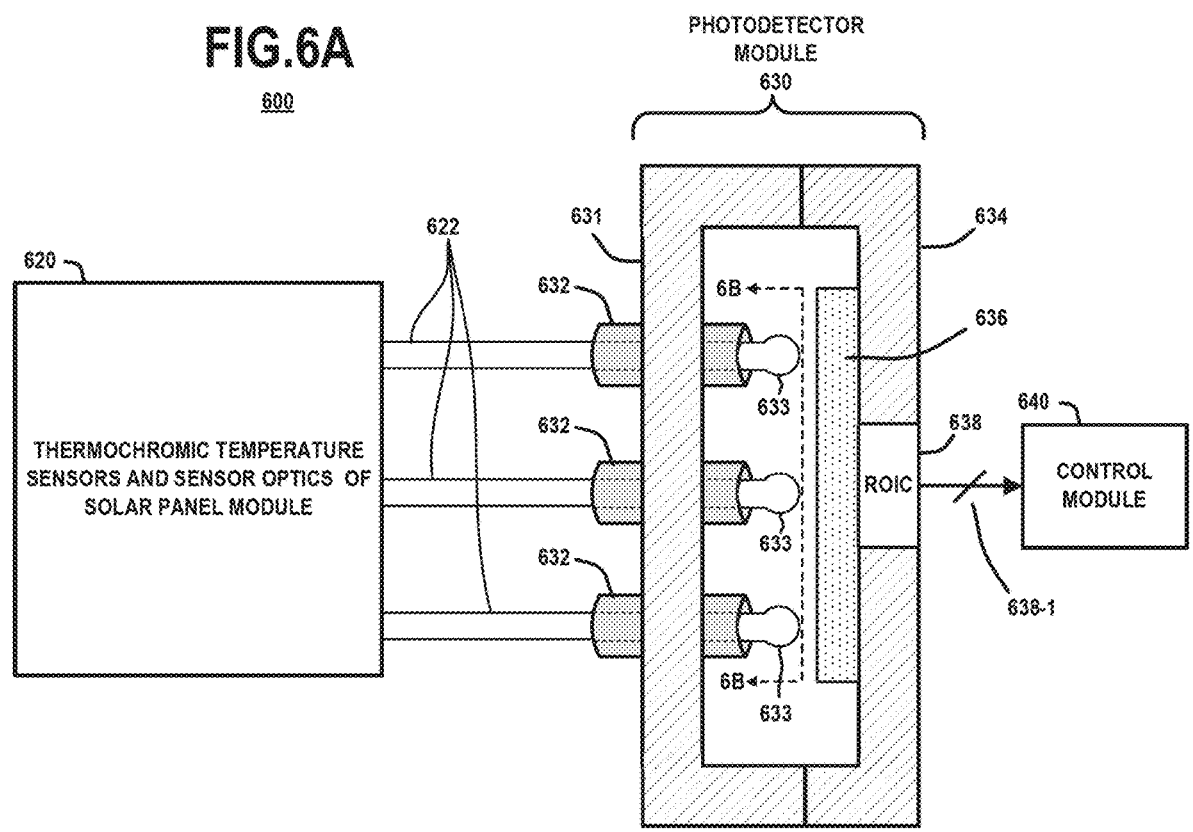
FIGS. 6A, 6B, and 6C schematically illustrate a photodetector module, according to an exemplary embodiment of the disclosure.
Figure 6B:
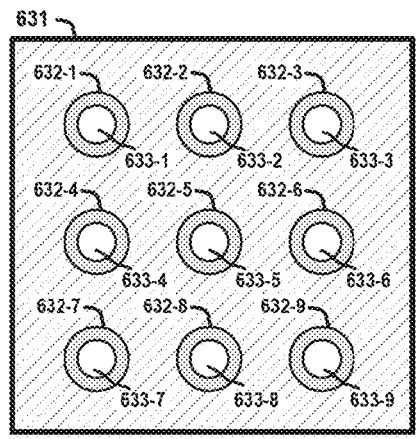
Figure 6C:
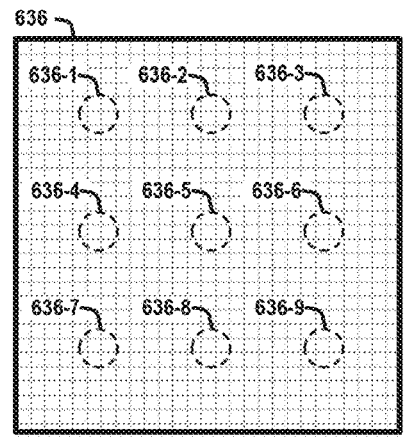

FIGS. 6A, 6B, and 6C schematically illustrate a photodetector module, according to an exemplary embodiment of the disclosure. More specifically, FIGS. 6A, 6B, and 6C schematically illustrate an exemplary photodetector module which can be implemented in a temperature sensing and control system for a given solar panel system, according to an exemplary embodiment of the disclosure. For example, FIG. 6A schematically illustrates a temperature sensing and control system 600 for a given solar panel system, wherein the temperature sensing and control system 600 comprises an arrangement of thermochromic temperature sensors and temperature sensor optics 620 of a given solar panel, a bundle of fiber optic cables 622, a photodetector module 630, and a control module 640. The thermochromic temperature sensors and sensor optics 620 capture optical color data from each group of solar cells of the given solar panel, and transmit the optical color data of each group of solar cells over corresponding fiber optic cables 622 to the photodetector module 630.

As shown in FIG. 6A, the photodetector module 630 comprises a fiber optic connector panel 631, and a photodetector panel 634, which are coupled face-to-face to each other. The fiber optic connector panel 631 comprises a plurality of fiber optic ferrules 632. The fiber optic ferrules 632 are mechanical fixtures, e.g., rigid tubes, which are used to confine stripped ends of the optical fibers of the fiber optic cables 622. The fiber optic ferrules 632 expose optical fiber tips 633 of the optical fibers of the fiber optic cables 622. In an exemplary embodiment, the optical fiber tips 633 comprise ball lenses. The fiber optic ferrules 632 are fixedly held in place by the fiber optic connector panel 631. In this regard, the fiber optic panel 631 serves as a central optical connector which arranges the optical fiber tips 633 of the optical fibers in a desired area array configuration to interface with the photodetector panel 634.

The photodetector panel 634 comprises a photodetector array 636 and an associated readout integrated circuit (ROIC) 638. In some embodiments, the photodetector array 636 comprises an RGB focal plane array imager sensor which comprises an array of red (R), green (G), and blue (B) pixels (e.g., Bayer Filter pixels). As is known in the art, a Bayer filter mosaic is a color filter array for arranging RGB color filters on an array of photosensors. In other embodiments, the photodetector array 636 comprises a custom designed Individual Bayer Pixels (IBP) imager sensor which comprises individual RGB pixels that are fabricated/configured on a field programmable gate array (FPGA) image sensor device. The RGB pixels are utilized for color imaging. In some embodiments, the RGB focal plane array image sensor or the IBP image sensor further comprise monochrome pixels to support grayscale imaging.

As shown in FIG. 6A, the fiber optic connector panel 631 and the photodetector panel 634 are coupled to each other, face-to-face, to interface the fixed array of optical fiber tips 633 of the optical fibers with an active surface of the photodetector array 636. In particular, FIG. 6B is schematic plan view of the fiber optic connector panel 631 along line 6B-6B in FIG. 6A. FIG. 6B illustrates an exemplary embodiment in which the fiber optic connector panel 631 fixedly secures an array of nine (9) fiber optic ferrules 632 (e.g., 632-1, 632-2, 632-3, 632-4, 632-5, 632-6, 632-7, 632-8, and 632-9) and corresponding optical fiber tips 633 (e.g., 633-1, 633-2, 633-3, 633-4, 633-5, 633-6, 633-7, 633-8, and 633-9). In this exemplary embodiment, the solar panel would have nine (9) groups of solar cells, and the thermochromic temperature sensors and sensor optics 620 of the solar panel would have nine (9) corresponding thermochromic temperature sensors (one for each group of solar cells), and nine (9) corresponding sensor optics and fiber optic cables (e.g., nine (9) optical systems 520 shown in FIG. 5B), with the nine (9) fiber optic cables 622 (FIG. 6A) extending from the backside of the solar panel to the photodetector module 630.

Further, FIG. 6C is a schematic plan view of a surface of the photodetector array 636 which faces the fiber optic panel 631. FIG. 6C schematically illustrates (by dashed circles) regions of pixels 636-1, 636-2, 636-3, 636-4, 636-5, 636-6, 636-7, 636-8, and 636-9, which are aligned to the respective optical fiber tips 633-1, 633-2, 633-3, 633-4, 633-5, 633-6, 633-7, 633-8, and 633-9, when the fiber optic connector panel 631 and the photodetector panel 634 coupled face-to-face to each other. In embodiments where the photodetector array 636 comprises an RGB focal plane array imager sensor, each pixel region 636-1, 636-2, 636-3, 636-4, 636-5, 636-6, 636-7, 636-8, and 636-9 would comprises a group of pixels of the RGB focal plane array image sensor which are actively used for the temperature sensing function, while other existing pixels of the focal plane array image sensor outside the active pixel regions 636-1, 636-2, 636-3, 636-4, 636-5, 636-6, 636-7, 636-8, and 636-9 would not be utilized. On the other hand, in embodiments where the photodetector array 636 comprises a custom designed IBP imager sensor, each pixel region 636-1, 636-2, 636-3, 636-4, 636-5, 636-6, 636-7, 636-8, and 636-9 would comprise one or more RGB Bayer pixels customed designed and utilized for the given application.

The photosensors (or pixels) of the photodetector array 636 are configured to convert the colored light, which is output from the optical fiber tips 633-1, 633-2, 633-3, 633-4, 633-5, 633-6, 633-7, 633-8, and 633-9, into photocurrent, and the ROIC 638 is configured to accumulate the photocurrent from each pixel and transfer the resultant signal (e.g., pixel data) to output taps for readout to the control module 640. In some embodiments, the ROIC 638 comprises a digital ROIC which generates and outputs digital pixel data to the control module 640. As noted above, the control module 640 is configured to process the electrical signals (e.g., pixel data) output from the photodetector module 630 to (i) determine colors of the thermochromic temperature sensors for the given solar panel, (ii) determine the temperatures of different areas of the solar panel based on the determined colors of the thermochromic temperature sensors, and to (iii) generate a control signal to shut down the solar panel, if needed, based on, e.g., the determined temperatures of the different areas of the solar panel.

Figure 7:
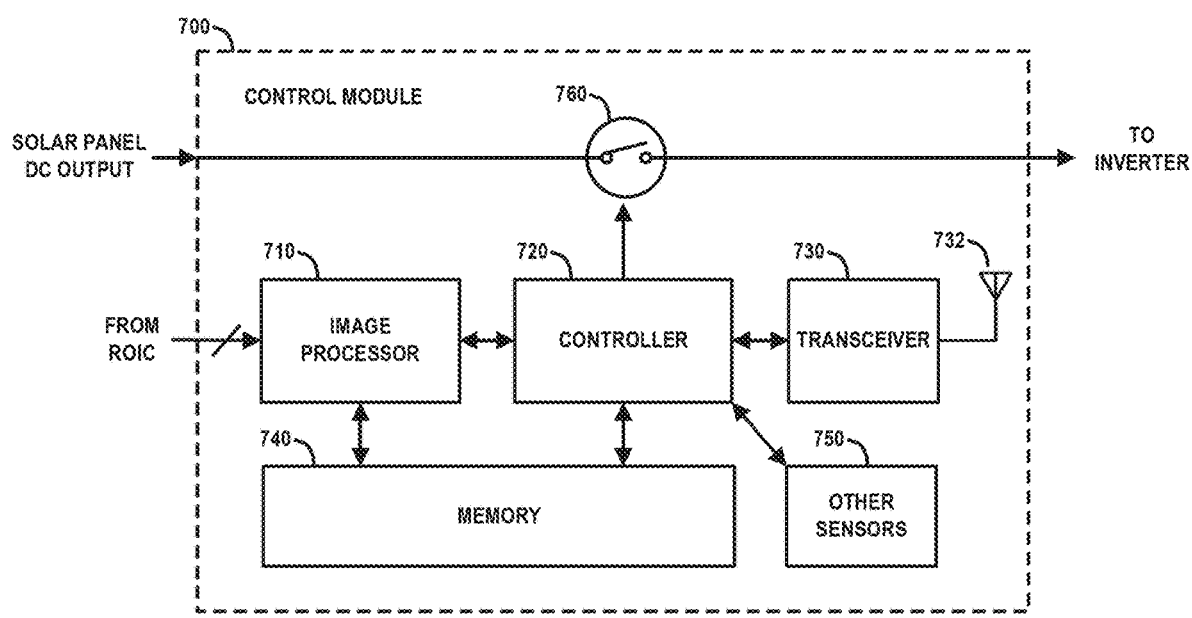
FIG. 7 schematically illustrates a control module, according to an exemplary embodiment of the disclosure.

FIG. 7 schematically illustrates a control module 700, according to an exemplary embodiment of the disclosure. The control module 700 comprises an image processor 710, a microcontroller 720, a transceiver 730 and associated antenna 732, a memory device 740, one or more sensors 750, and a power switch 760. In some embodiments, FIG. 7 schematically illustrates an exemplary architecture of a control module which can be utilized to implement the control modules 240-1, 240-2, . . . , 240-n (FIG. 2) or the control module 640 (FIG. 6A).

The image processor 710 is configured to (i) receive pixel data from the ROIC of the photodetector module, and (ii) process the pixel data to determine colors (or grayscale level) of the thermochromic temperature sensors for a given solar panel. The image processor 710 can be implemented using any type of image processing engine, image processing unit, image signal processor, or digital signal processor configured for image processing. The controller 720 is configured to process the color information (or grayscale information) output from the image processor 710 to, e.g., determine the temperatures of the thermochromic temperature sensors for the given solar panel based on the determined color or grayscale information of the thermochromic temperature sensors. In addition, the controller 720 is configured to control various functions of the control module 700.

In some embodiments, the controller 720 comprises a microprocessor, a microcontroller, an application-specific integrated circuit (ASIC), a field-programmable gate array (FPGA), or another type of programmable device, which is configured to implement control functions as described herein. In some embodiments, the controller 730 comprises internal cache memory, e.g., volatile random-access memory (RAM) such as static RAM, and an internal non-volatile flash memory to store program code (e.g., firmware) which is executed by the controller 720 to control and manage the operation of the given solar panel.

In some embodiments, the memory device 740 comprise a non-volatile memory device, such as a flash memory device, an SSD (solid state drive) device, or other types and combinations of non-volatile memory devices, which are suitable for the given application. The memory device 740 is utilized for various purposes including, but not limited to, storing program code which is executed by the image processor 710 and controller 720, persistently storing an operating state the given solar panel, and other relevant data. For example, in some embodiments, the memory device 740 stores program code of a demosaicing algorithm which is executed by the image processor 710 to process the received pixel data and determine an appropriate color and brightness value for each pixel using known techniques. In other embodiments, the memory device 740 stores program code which is executed by the image processor 710 to determine a grayscale level of the pixels from the pixel data, according to a predefined n-bit quantization (e.g., 2-bit, 4-bit, 8-bit, etc.). In addition, the memory device 740 stores program code of control and test routines which are executed by the controller 720 to control operation of the given solar panel and other functions, the details of which will be explained in further detail below.

The memory device 740 which stores program code for execution by the image processor 710 and controller 720 is an example of what is more generally referred to herein as a processor-readable storage medium having program code embodied therein, and may comprise, for example, electronic memory such as SRAM, DRAM or other types of random-access memory, read-only memory (ROM), flash memory, magnetic memory, optical memory, or other types of storage devices in any combination. Articles of manufacture comprising such processor-readable storage media are considered embodiments of the invention. The term "article of manufacture" as used herein should be understood to exclude transitory, propagating signals.

In some embodiments, the transceiver 730 comprises a wireless transceiver which is configured to enable wireless network communication with remote nodes, or remote computing devices and systems. The transceiver 730 can implement a standard wireless communication protocol such Wi-Fi®, Bluetooth®, ZigBee®, and other types of standards-based wireless communication protocols. In some embodiments, the antenna 732 comprises whip antenna or any other type of antenna system or device which is suitable for the given application. The transceiver 730 is configured to transmit control information regarding operation of the given solar panel, and other useful information, to a remote node or system over wireless network connection. For example, is some embodiments, the transceiver 730 is utilized to transmits alerts or notifications regarding solar panel operation to remote nodes, or remote computing devices and systems, to provide alerts when, e.g., the solar panel has been shut down due to overheating, etc.

The sensors 750 are configured to provide various sensing modalities for detecting and capturing different types of relevant data in a given environment. For example, in some embodiments, the sensors 750 include a temperature sensor which is configured to detect an ambient temperature of the environment. In some embodiments, the ambient temperature information is utilized by the controller 720 when executing control routines for, e.g., (i) detecting potential overheating of solar cells of the given solar panel, (ii) adjusting the control routines for monitoring and detecting the temperatures of groups of solar cells of the solar panel, and for (iii) determining when to power down and/or power up the solar panel, based on the ambient temperature. In some embodiments, the sensors 750 include light sensors to detect a level of ambient light, wherein the level of ambient light is considered by the controller 720 when executing the control routines to control operation of the solar panel.

In some embodiments, the control module 700 implements the power switch 750 as part of control circuitry of the control module 700 to connect or disconnect the DC output of the given solar panel to the input of the inverter module. As noted above, in some embodiments, the power switch comprises a power MOSFET device having a drain terminal coupled to the DC output line of the solar panel, a source terminal coupled to an input of the inverter module, and a gate terminal coupled to switch control circuitry which, in some embodiments, is implemented by the controller 720. More specifically, in some embodiments, the controller 720 is configured to generate a control signal to drive the gate terminal of the power MOSFET switch 760. When the controller 720 determines that one or more groups of solar cells of the given solar panel are overheating, the controller 720 will generate a control signal to deactivate (turn off) the power MOSFET switch 760 and thereby disconnect the DC output of the solar panel from the input of the inverter module. The deactivation of the power MOSFET switch 760 essentially cuts off the flow of DC current flow through the solar cells and, thus, effectively shuts down the operation of the given solar panel.

As noted above, the control module 700 is configured to execute control routines (e.g., via software code in the memory device 740) to control operation of a given solar panel based on multimodal information. For example, the control module 700 is configured to detect for shadowing conditions caused by, e.g., debris, obstructions, etc., which are present on the surface of the solar panel and which block incident sunlight from reaching one or more solar cells of the solar panel. In this regard, the control module 700 is configured to protect the solar panel from overheating and possible damage by actively monitoring the temperature of different portion of the solar panel in real time based on, e.g., sensing light loss from a shadow or other light blocking material, and/or detecting change in color of the thermochromic temperature sensors as a result of increased heating of one or more groups of solar cells of the solar panel.

More specifically, in some instances, the shadowing condition blocks incident light from one or more solar cells of the solar panel, potentially causing overheating of such solar cells due to the shadowing effect. In such instances, the control module 700 can determine the existing of the shadowing condition based on the detected change in color of one or more thermochromic temperature sensors of the solar panel due to the increased heating of the shadowed solar cells, and utilize the detected color changes to determine if the solar panel should be shut down to protect against overheating. On the other hand, in some instances, the shadowing condition may block one or more of the through holes (e.g., through holes 314 (FIG. 3), through holes 414 (FIG. 4, through hole 514 FIGS. 5A and 5B) that are formed through the supporting substrate of the solar panel, as well as one or more solar cells. In such instances, since the intensity of light (luminance) detected for a given optical interface channel for a given solar cell group of the solar panel will be zero or very low, as compared to the other optical interface channels associated with other solar cells groups with non-blocked through holes, the control module 700 will immediately know that there is a shadow condition (e.g., obstruction) in the given group of solar cells of the solar panel. In this instance, the control module 700 can shut down the solar panel as a precautionary measure to prevent possible overheating of portion of the solar panel, and possible damage as a result of such overheating.

In other embodiments, the control module 700 can transmit a notification or alert to a remote node or system to provide notice of the shadowing condition (to enable a person remove the obstruction from the solar panel), and shut down the solar panel if the shadow condition actually causes increased heating of a portion of the solar panel. Moreover, since each individual group of solar cells of a given solar panel are independently monitored for shadowing condition and overheating, the control module 700 will know which portion of the solar panel has the problematic shadow condition, and such information can be reported to an individual responsible for maintaining the solar patent.

During operation, when a given shadow condition or overheating condition is detected by the control module 700 for a given solar panel, the control module 700 can proceed to shut down the solar panel, to prevent possible damage due to overheating caused by the shadow condition, and then enter into a wait state to keep the solar panel shut down for a predetermine period of time, before allowing the solar panel to be powered up after the shadow condition no longer exists. This prevents the solar panel from being rapidly shut down and powered up in instances, where, for example, the shadow condition is cause by temporary obstructions, e.g., leaves that fall onto the surface of the solar panel, and then are blown off by wind. In this example, the leaves can block a given through hole of the solar panel, thereby triggering the control module 700 to shut down the solar panel (e.g., disconnecting the DC power output line of the solar panel from an input of the inverter module). However, the leaves may blow off at the same time (or close in time) when the solar panel is shut down. In this instance, even if the shadow condition is detected to no longer exist, the control module 700 may wait for a predetermined period of time (e.g., 1 minute, 5 minutes, 10 minutes, etc.) before reconnecting the DC output of the solar panel to the inverter to thereby prevent the rapid on/off toggling of the solar panel.

In some embodiments, the photodetector module and image processor are configured to detect and determine other types of light-related information which can be used by the controller 720 to perform control functions. For example, the photodetector module and image processor can be configured to measure luminance to detect a difference between daylight and nighttime, and storm-related luminance. Furthermore, if the photodetector module and image processor are highly sensitive to color, the photodetector module and image processor can detect slight wavelength shifts of the different colors of light which result from, e.g., seasonal sunlight changes as the sun changes angular position between the equatorial and polar influences. The atmosphere essentially serves as a filter which slightly changes the colors of the incident light based on the day in the year and seasons, and the time of day. In such instances, the control module 700 can utilize the temperature change data (detected color of thermochromic temperature sensors) in combination with the luminance data and make assumptions about the seasonal and weather changes in the sunlight exposure, by utilizing software that is executed by the controller 720.

Figure 8A:
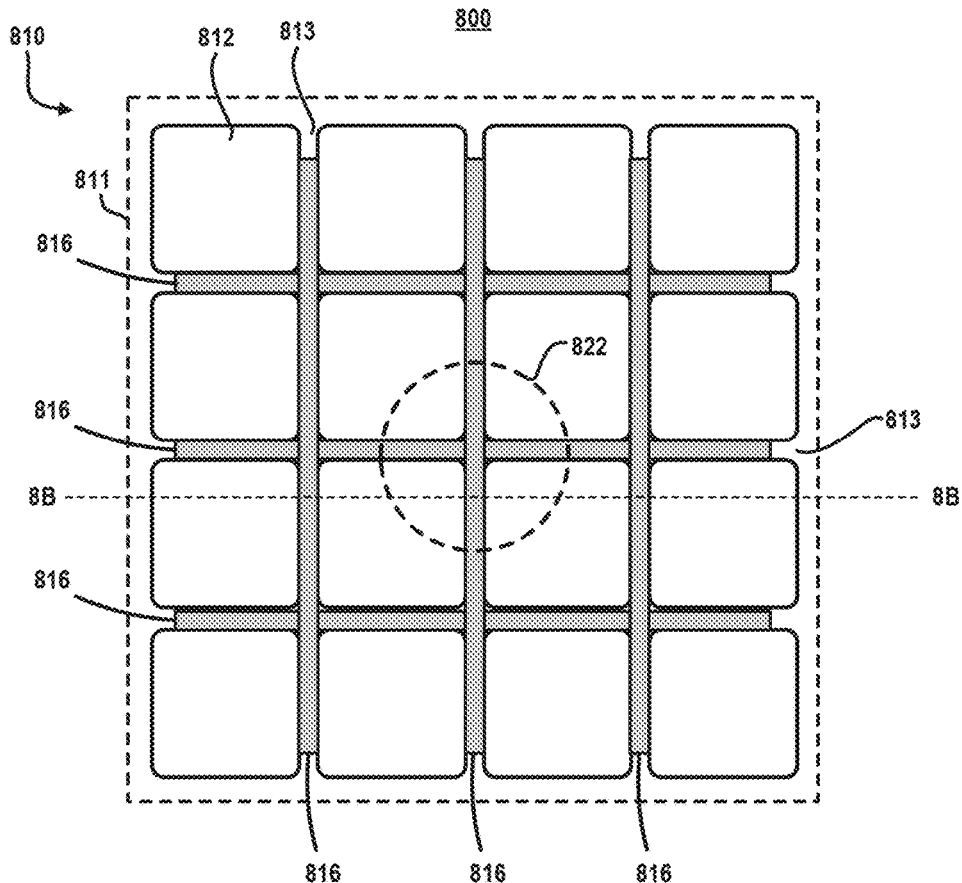
FIGS. 8A and 8B schematically illustrate a solar panel having thermochromic polymer temperature sensors, according to another exemplary embodiment of the disclosure.
Figure 8B:
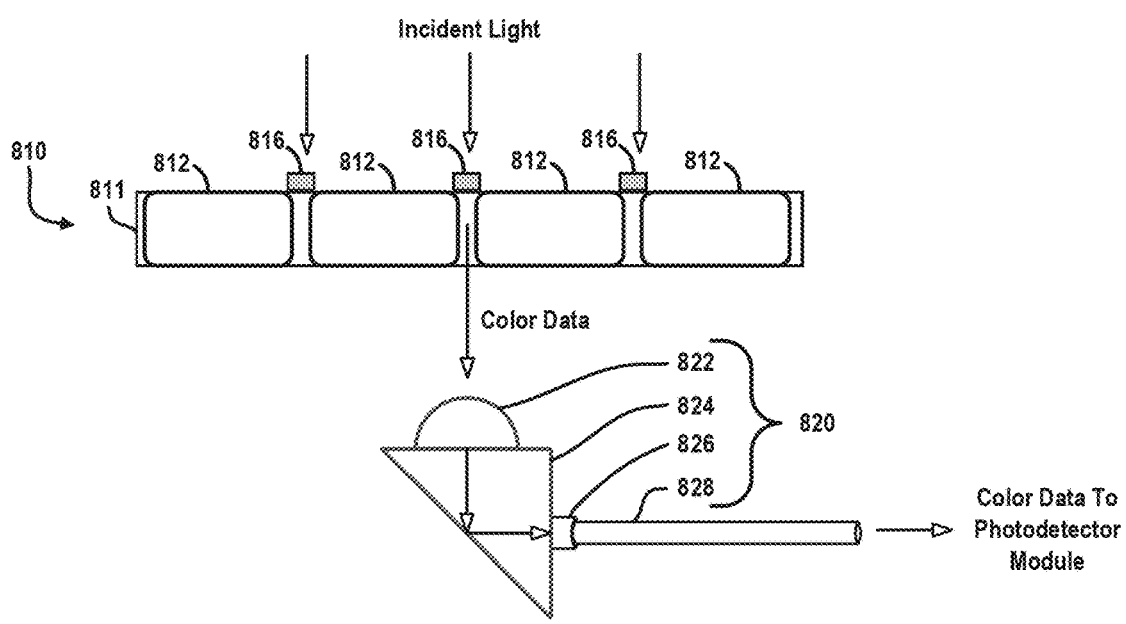

FIGS. 8A and 8B schematically illustrate a solar panel having thermochromic polymer temperature sensors, according to another exemplary embodiment of the disclosure. In particular, FIG. 8A schematically illustrates a thermochromic polymer temperature sensor system 800 which is implemented for a solar panel 810 comprising a plurality of solar cells 812 embedded in a supporting substrate 811, and a thermochromic temperature sensor 816 which is thermally coupled to a frontside of the supporting substrate 811 of the solar panel 810 in spaces 813 between solar cells 812. For ease of illustration and discussion, FIG. 8A illustrates a portion of the solar panel 810 having a thermochromic temperature sensing group of twelve (12) solar cells, wherein the group of solar cells is individually monitored for overheating due to shadowing of one or more solar cells 812 within the group of solar cells.

Moreover, FIG. 8B schematically illustrates a cross-sectional side view of the solar panel 810 along line 8B-8B in FIG. 8A, as well as an optical interface 820 associated with the thermochromic temperature sensor 816. As schematically illustrated in FIG. 8B, the thermochromic temperature sensor 816 is disposed on a front side of the supporting substrate 811 and in thermal communication with each of the twelve (12) solar cells 812 within the thermochromic temperature sensing group. The optical interface 820 (or optical system 820) comprises a lens 822, a prism 824, a fiber optic ferrule 826, and a fiber optical cable 828, similar in configuration and function as the optical interface 520 of FIG. 5B, as discussed above. The footprint of the lens 822 is shown in FIG. 8A as a hidden circular (dashed) line.

In the exemplary embodiment of FIGS. 8A and 8B, it is assumed that the material of the supporting substrate 811 is translucent to light. As such, as shown in FIG. 8B, incident light (e.g., sunlight) on the front surface of the solar panel 810 illuminates the thermochromic temperature sensor 816. The thermochromic temperature sensor 816 is translucent so that incident light on the thermochromic temperature sensor 816 emerges from the thermochromic temperature sensor 816 as colored light, and the colored light passes through the regions of the supporting substrate 811 between the solar cells 812 and emerges from the backside of the supporting substrate 811. The lens 822 and prism 824 serve to capture the colored light and direct the colored light to the fiber optic cable 828, wherein the colored light is sent to an associated photodetector module.

In other embodiments, the thermochromic temperature sensor 816 can be disposed on a back side of the supporting substrate 811 in the spaces 813 between solar cells 812, and in thermal communication with each of the twelve (12) solar cells 812 within the thermochromic temperature sensing group. Since the supporting substrate 811 is translucent to light, incident light (e.g., sunlight) on the front surface of the solar panel 810 passes through the spaces 813 of the supporting substrate 811 to illuminate the thermochromic temperature sensor 816 on the backside of the supporting substrate 811, and the colored light emerging from the thermochromic temperature sensor 816 is captured by the optical interface 820.

It is to be appreciated that the temperature sensing and control systems as described herein can be implemented on existing solar panels as a retrofit, or on new panels or panel modules. The thermochromic temperature sensors and associated through holes would be configured and arranged based on, e.g., common shadow conditions that occur on a given solar panel based on historical data for a given location. The solar panels can be positioned to provide optimum coverage for a given location, and modular panel designs allow for specialized coverages.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system, comprising:
a solar panel comprising a plurality of solar cells, and a plurality of thermochromic temperature sensors thermally coupled to different areas of the solar panel, wherein the thermochromic temperature sensors are configured to change color in response to heat generated by the solar cells in the different areas of the solar panel; and
a control system configured to detect colors of the thermochromic temperature sensors, determine a temperature of each area of the solar panel based on the detected colors of the thermochromic temperature sensors, and cause the solar panel to shut down in response to determining that the temperature of at least one area of the solar panel exceeds a predetermined temperature threshold;
wherein the thermochromic temperature sensors are disposed on a backside of a solar cell supporting substrate of the solar panel;
wherein the supporting substrate comprises a plurality of through holes which extend from a frontside of the supporting substrate to the backside of the supporting substrate; and
wherein each through hole of the plurality of through holes is aligned to a respective one of the thermochromic temperature sensors disposed on the backside of the supporting substrate.

2. The system of claim 1, wherein each thermochromic temperature sensor is thermally coupled to an associated group of solar cells.

3. The system of claim 1, wherein the control system comprises:
an optical system in optical communication with the thermochromic temperature sensors;
a photodetector module coupled to the optical system; and
a control module coupled to the photodetector module.

4. The system of claim 3, wherein:
the optical system is configured to capture colored light which emerges from each thermochromic temperature sensor, and transmit the colored light to the photodetector module;
the photodetector module is configured to convert the colored light from each thermochromic temperature sensor into electrical signals; and
the control module is configured to process the electrical signals to determine the temperature of each area of the solar panel.

5. The system of claim 3, wherein the control module comprises a power switch device which is configured to selectively connect or disconnect a power output line of the solar panel to or from an input to an inverter module, based on the determined temperatures of each area of the solar panel.

6. The system of claim 3, wherein the photodetector module comprises an RGB focal plane array image sensor which is configured to the colored light from each thermochromic temperature sensor into electrical signals.

7. The system of claim 3, wherein the photodetector module comprises field programmable gate array (FPGA) device configured with plurality of RGB pixels, wherein each RGB pixel is configured convert colored light from one of the thermochromic temperature sensors into electrical signals.

8. The system of claim 1, wherein the control system is disposed on the solar panel.

9. The system of claim 1, wherein the control system is implemented as part of a micro-inverter module disposed on solar panel.

10. The system of claim 1, further comprising an inverter module having an input that is connected to a DC power output line of the solar panel through the control system, wherein the control system is configured to selectively connect or disconnect the DC power output line of the solar panel to or from the input to an inverter module, based on the determined temperatures of each area of the solar panel.

11. The system of claim 1, wherein the thermochromic temperature sensors are formed of a thermochromic polymer material that is disposed on a surface of a solar cell supporting substrate of the solar panel.

12. The system of claim 1, wherein the control system is further configured to (i) detect a shadow condition which blocks incident sunlight from one or more solar cells, and (ii) cause the solar panel to shut down in response to detecting the shadow condition.

13. The system of claim 1, wherein the control system comprises a transceiver module, which is configured to transmit information regarding an operational status of the solar panel to a remote node or system, and to receive information or commands from a remote node or system.

14. The system of claim 1, wherein the control system comprises a processor which is configured to execute software code to intelligently control operation of the solar panel.

15. The system of claim 1, wherein the control system comprises one or more sensors including at least one of a light sensor and a temperature sensor.

16. A system, comprising:
a solar panel comprising a plurality of solar cells, and a plurality of thermochromic temperature sensors thermally coupled to different areas of the solar panel, wherein the thermochromic temperature sensors are configured to change color in response to heat generated by the solar cells in the different areas of the solar panel; and
a control system configured to detect colors of the thermochromic temperature sensors, determine a temperature of each area of the solar panel based on the detected colors of the thermochromic temperature sensors, and cause the solar panel to shut down in response to determining that the temperature of at least one area of the solar panel exceeds a predetermined temperature threshold;
wherein the control system comprises:
an optical system in optical communication with the thermochromic temperature sensors;
a photodetector module coupled to the optical system; and
a control module coupled to the photodetector module; and
wherein the optical system comprises:
a plurality of optical interfaces, wherein each optical interface is associated with a respective one of the thermochromic temperature sensors;
wherein each optical interface comprises a lens, a prism coupled to the lens, and a fiber optic cable coupled to the prism;
wherein the lens is configured to collect and focus the colored light which emerges from the associated thermochromic temperature sensor;
wherein the prism is configured to reflect the focused colored light into the fiber optic cable; and
wherein the fiber optic cable is configured to transmit the colored light from the associated thermochromic temperature sensor to the photodetector module.

17. The system of claim 16, wherein the thermochromic temperature sensors are disposed on at least one of a frontside and a backside of a solar cell supporting substrate of the solar panel in spaces between the solar cells.

\* \* \* \* \*